Nov. 12, 1929.  C. BETHEL  1,735,105
FLEXIBLE GEAR WHEEL
Filed April 12, 1926  2 Sheets-Sheet 2

WITNESSES:

INVENTOR
Claude Bethel.
BY
ATTORNEY

Patented Nov. 12, 1929

1,735,105

UNITED STATES PATENT OFFICE

CLAUDE BETHEL, OF WILKINSBURG, PENNSYLVANIA, ASSIGNOR TO WESTINGHOUSE ELECTRIC AND MANUFACTURING COMPANY, A CORPORATION OF PENNSYLVANIA

FLEXIBLE GEAR WHEEL

Application filed April 12, 1926. Serial No. 101,354.

My invention relates to flexible elements and particularly to gear wheels embodying flexible elements to permit relative angular displacement of the gear rim portion and a supporting hub or center portion.

An object of my invention is to provide a flexible gear wheel which shall be of simple, compact and durable construction.

A further object of my invention is to provide a flexible gear wheel that shall be inexpensive to manufacture and easily assembled or taken apart.

Another object of my invention is to provide a flexible gear wheel in which the spring elements have a rising characteristic that may be represented by a smooth curve.

My present invention is directed to a flexible gear element in which the flexible member is substantially a segment of an annulus and is completely enclosed within the gear wheel. In practicing my invention, I utilize a single annular spring elevent having a segment removed to provide bearing ends and mount it within the gear wheel in such manner that tangential forces resulting from the transmission of torque through the gear wheel act against the ends of the spring element in compression.

Figure 1:
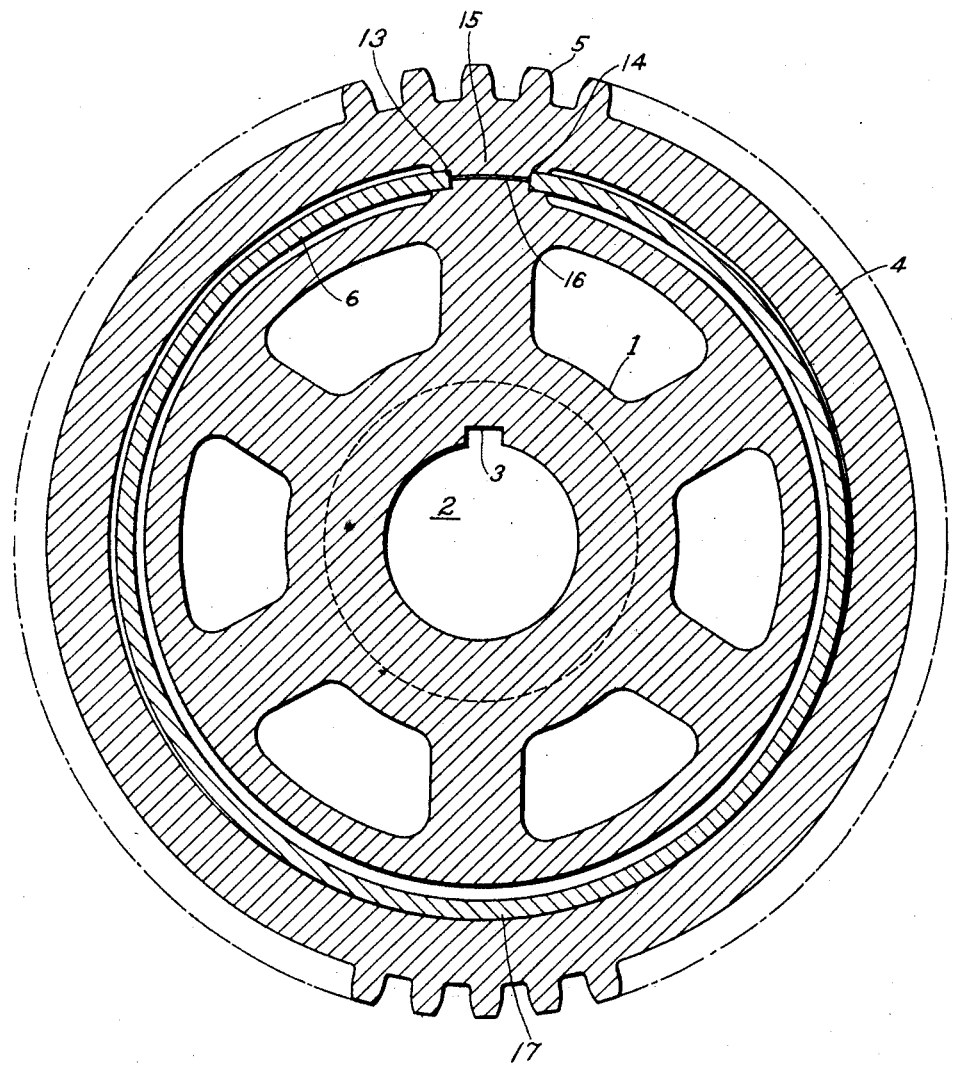
Figure 2:
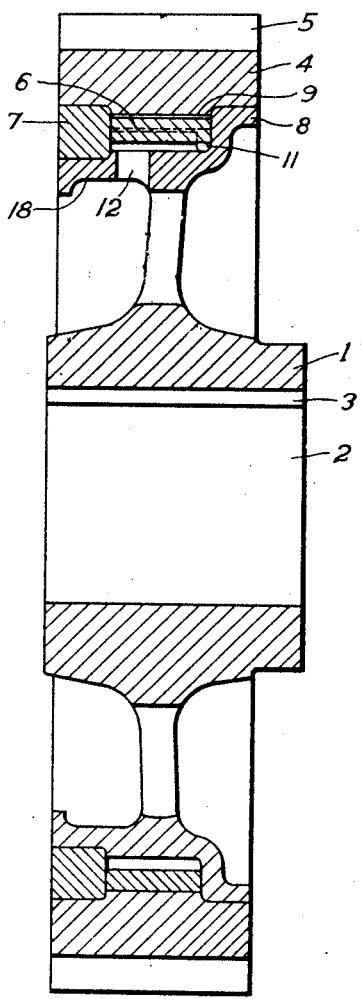

In the accompanying drawings,

Fig. 1 is a view in transverse cross-section of a flexible gear wheel embodying the principles of my invention, Fig. 2 is a view in longitudinal cross-section of the gear wheel of Fig. 1.

Referring to the drawings, the device therein illustrated comprises a gear center or hub portion 1 having a central opening 2 provided with a key way 3 that constitutes the seat by means of which the gear wheel is mounted. A gear rim 4 having a toothed outer periphery 5 is mounted upon the hub portion 1 and is operatively connected thereto by means of an annular spring element 6 and a retaining ring 7. The gear rim 4 bears upon the cylindrical surface of a flange 8 on one side of the gear center 1 and upon the cylindrical surface of the retaining ring 7 on the other side of the gear center and is restrained from lateral movement by a shoulder 9 on the gear rim 4 that projects into a chamber 11 between the flange 8 and the retaining ring 7. A hole 12 is provided in the gear center 1 for admitting lubricant to the chamber 11. The spring element 6 that is retained within the chamber 11 terminates in bearing ends 13 and 14 that respectively engage a lug 15 on the inner surface of the gear rim 4 and a lug 16 on the outer surface of the gear center 1. The gear rim lug 15 is so made that the ends of the spring 6 are held slightly away from the normal inner periphery of the gear rim 4.

After the gear is assembled and the parts are in their normal positions, the portion 17 of the spring element 6 diametrically opposite the bearing ends 13 and 14 bears against the gear rim 4.

One of the features of the present gear wheel construction is the ease with which the unit may be assembled. This operation is performed by first inserting the spring element 6 inside the gear rim 4 and engaging the ends 13 and 14 with the lug 15. The rim 4 and spring 6 may then be placed upon the gear center 1 in such position that the spring ends 13 and 14 engage the lug member 16. The retaining ring 7 is then pressed into place, thereby completely enclosing the spring member 6 within the chamber 11 and restraining the rim 4 from lateral movement.

The operation of this device and particularly of the spring element is briefly as follows: The gear rim 4 is engaged by a toothed pinion element (not shown) at its outer periphery and torque is transmitted through the gear rim 4 and lug 15 to the spring element 6 and through the spring element 6 to the lug 16 and the gear center 1. The lug 15 bears against spring end 13, and the spring end 14 bears against the lug 16 or conversely, the lug 15 bears against the spring end 14 and the spring end 13 bears against the lug 16, depending upon the direction of the torque applied to the rim 4.

When the device is thus subjected to a torsional load, the spring element 6 allows the rim 4 to yield tangentially with respect to the center 1 by unwinding and conforming to the inner periphery of the gear rim 4 in the region of the portion 17. This unwinding action of the spring results in shortening the effective spring length as the portion conforming to the inner periphery of the gear rim can deflect no further. The result of this shortening action is to give the spring a rising characteristic, that is, a resistance to deflection that increases with the deflection. This characteristic is very effective in damping vibrations and as the deflection becomes relatively small in proportion to the load at high torques, no positive connections or stops are required.

The gear is self-lubricating, a basin 18 being provided on the inner side of the gear center for collecting lubricant from the gear case. The lubricant then drains through the hole 12 into the spring chamber 11 and out between the bearing surfaces of the gear rim 4 and the surfaces of the flange 8 and the retaining ring 7.

It is feasible that this type of gear wheels be made with the gear center, spring, and retaining ring common to a series of gear wheels of different diameters, the different diameters being accommodated by simply varying the rim thicknesses. It is evident from the foregoing description of my invention that a flexible gear wheel made in accordance therewith is mechanically simple and durable and is adapted to operate with a minimum of shock and noise.

Although I have described a specific embodiment of my invention, I do not wish to be limited by the construction illustrated, as it is obvious to those skilled in the art that various modifications may be made in the details of construction and in the arrangement and relation of the several cooperating parts without departing from the principles herein set forth.

I claim as my invention:

1. A flexible gear-wheel comprising a center portion, a rim portion, stops provided on the center portion and the rim portion, a spring element and a retaining ring, said spring element comprising an annular spring member having a portion removed to provide faces for engagement with the stops provided on said center and rim portions and disposed to engage the rim at a point diametrically opposite the stops at all times.

2. A flexible gear-wheel comprising a center portion, a rim portion, an annular spring element having an outer radius smaller than the inner radius of the gear rim and means on the center and rim portions for engaging the ends of the spring element, said spring element being adapted to engage the rim at a point diametrically opposite the ends at all times and to conform to the inner diameter of the rim under deflection when torque is transmitted by the gear-wheel in either direction to provide an effective spring length inversely proportional to the tangential load on the gear-wheel.

3. A flexible gear wheel comprising a center portion having a radially extending lug member, a rim portion having a cooperating inwardly extending lug member that is adapted to bear upon the outer surface of the lug member on the center portion and a spring element having the form of an annulus with a segment removed to provide faces for engaging said lug members.

4. A flexible gear wheel comprising a center portion having a radially extending lug member, a rim portion having a cooperating inwardly extending lug member that is adapted to bear upon the outer surface of the lug member on the center portion and a spring element having the form of an annulus with a segment removed to provide faces for engaging said lug members, said spring element being adapted to be forced into conformation with the gear rim-portion under tangential deflection.

5. A flexible gear-wheel comprising a center portion, a rim portion carried by the center portion, a spring element and means on the center and rim portions for engaging the ends of the spring element to force it into engagement with the inner surface of the rim portion to an extent having a definite relation to the load when torque is transmitted by the gear-wheel in either direction.

6. The combination with a gear center, of a gear rim carried by the gear center, an annular resilient member for transmitting torque between the gear center and the gear rim and means on the center and the rim for engaging the ends of the resilient member said resilient member having a radius shorter than the inner radius of and disposed substantially co-axially with the gear rim and being adapted to deflect by progressively conforming to the inner surface of the gear rim when loaded tangentially in either direction.

7. A flexible gear-wheel comprising a center portion, a rim portion carried by the center portion, an annular spring element having an outer radius shorter than the inner radius of the gear rim, said spring element, center porter and rim portion having a substantially common axis and means on the center and the rim portions for engaging the ends of the spring element to force it into conformation with the rim portion when torque is transmitted by the gear-wheel in either direction.

8. A flexible gear-wheel comprising a hub, a gear rim carried by the hub, said hub and rim being each provided with lug members, and a spring element having the shape of an annulus with a section removed to provide a pair of faces for normally engaging both the lug on the hub and the lug on the rim, said spring element being at all times in engagement with the inner surface of the rim at a point diametrically opposite the lug on the rim.

9. A flexible gear-wheel comprising a hub, a lug member on the hub, a gear rim carried by the hub and having a cooperating lug member and a spring element having the shape of an annulus with a section removed to provide faces for engaging the lug members on the hub and the rim, said spring element being so disposed between the hub and the rim that when on torque is being transmitted by the gear-wheel the spring faces will each engage the lug on the hub and the lug on the rim and a portion of the spring diametrically opposite the faces will engage the inner surface of the rim.

10. A flexible gear-wheel comprising a hub, a gear rim carried by the hub, cooperating lugs on the hub and gear rim and a spring element having the shape of an annulus with a segment removed, said spring element being disposed between the hub and rim in such manner that when no torque is being transmitted by the gear-wheel each end of the spring element will engage the lug on the hub and the lug on the rim and a portion of the spring opposite the ends will engage the inner surface of the rim; and when working torque is being transmitted by the gear-wheel in either direction, one end of the spring will become disengaged from the lug on the hub and the other end will become disengaged from the lug on the rim.

11. A flexible gear-wheel comprising, in combination, a hub, a gear rim carried by the hub, a resilient member having the shape of an annulus for transmitting force between the hub and the rim, said spring member, hub and rim being disposed with a substantially common axis, means provided on the resilient member for engaging the hub and the rim, and lugs provided on the hub and the rim for receiving the engaging means provided on the resilient member, said lugs being disposed to permit the resilient member to change the relative positions of the hub and rim members when the transmission of force ceases.

12. A flexible gear-wheel comprising, in combination, a hub, a gear rim carried by the hub, a resilient member having the shape of an annulus for transmitting force between the hub and the rim, said spring member, hub and rim being disposed with a substantially common axis, means provided on the resilient member for engaging the hub and the rim, and lugs provided on the hub and the rim for receiving the engaging means provided on the resilient member, said lugs being disposed to cause the resilient member to deflect by conforming progressively to the shape of the inner surface of the gear rim when force is being transmitted in either direction between the hub and the rim and to an extent bearing a definite relation to the force being transmitted.

13. A flexible gear-wheel comprising, in combination, a hub, a gear rim carried by the hub, a resilient member having the shape of an annulus for transmitting force between the hub and the rim, said spring member, hub and rim being disposed with a substantially common axis, means provided on the resilient member for engaging the hub and the rim, and lugs provided on the hub and the rim for receiving the engaging means provided on the resilient member, said resilient member being disposed to engage the rim at all times at a portion other than the engaging means and to an extent depending on the force being transmitted.

In testimony whereof, I have hereunto subscribed my name this 30th day of March, 1926.

CLAUDE BETHEL.